(12) United States Patent
Goodlein

(10) Patent No.: US 9,557,851 B2
(45) Date of Patent: *Jan. 31, 2017

(54) CONFIGURABLE TOUCH SCREEN LCD STEERING WHEEL CONTROLS

(71) Applicant: Panasonic Automotive Systems Company of America, Division of Panasonic Corporation of North America, Peachtree City, GA (US)

(72) Inventor: Mark Goodlein, West Henrietta, NY (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,886

(22) Filed: Sep. 17, 2015

(65) Prior Publication Data

US 2016/0004383 A1 Jan. 7, 2016

Related U.S. Application Data

(63) Continuation of application No. 14/638,759, filed on Mar. 4, 2015, now Pat. No. 9,164,619.

(60) Provisional application No. 61/947,620, filed on Mar. 4, 2014.

(51) Int. Cl.
| | | |
|---|---|---|
| *G06F 3/0488* | (2013.01) | |
| *G06F 3/0484* | (2013.01) | |
| *G06F 3/041* | (2006.01) | |
| *G06F 3/0482* | (2013.01) | |
| *B60K 35/00* | (2006.01) | |
| *G09G 3/36* | (2006.01) | |

(52) U.S. Cl.
CPC ............ *G06F 3/0416* (2013.01); *B60K 35/00* (2013.01); *G06F 3/0412* (2013.01); *G06F 3/0482* (2013.01); *G06F 3/0484* (2013.01); *G06F 3/0488* (2013.01); *G06F 3/04847* (2013.01); *G09G 3/36* (2013.01); *B60K 2350/1028* (2013.01); *B60K 2350/928* (2013.01); *G09G 2380/10* (2013.01)

(58) Field of Classification Search
CPC .................................................... G06F 3/0482
See application file for complete search history.

(56) References Cited

U.S. PATENT DOCUMENTS

| | | | | |
|---|---|---|---|---|
| 5,220,675 A | * | 6/1993 | Padawer | ............... G06F 8/38 715/826 |
| 5,497,455 A | * | 3/1996 | Suga | ................. G06F 3/0482 715/810 |
| 5,677,708 A | * | 10/1997 | Matthews, III | ....... G06F 3/0482 348/E5.104 |
| 5,691,695 A | * | 11/1997 | Lahiff | ................ B60K 37/02 340/439 |

(Continued)

*Primary Examiner* — Patrick F Marinelli
(74) *Attorney, Agent, or Firm* — Laurence S. Roach, Esq.

(57) ABSTRACT

An entertainment system control arrangement for a motor vehicle includes a graphical LCD with a configurable touch screen. The graphical LCD is disposed on the steering wheel. A processor is communicatively coupled to the graphical LCD. The processor prompts a user to select a function to assign to the configurable touch screen. The processor assigns the selected function to the configurable touch screen.

18 Claims, 1 Drawing Sheet

(56) References Cited

U.S. PATENT DOCUMENTS

| | | | | |
|---|---|---|---|---|
| 5,821,935 A * | 10/1998 | Hartman | ............... | B60K 37/06 307/10.1 |
| 6,373,472 B1 * | 4/2002 | Palalau | ............... | B60K 37/02 345/156 |
| 6,434,450 B1 * | 8/2002 | Griffin, Jr. | ............... | B60K 37/02 701/1 |
| 8,078,359 B2 * | 12/2011 | Small | ............... | B60K 35/00 701/1 |
| 8,843,268 B2 * | 9/2014 | Lathrop | ............... | B60K 35/00 340/438 |
| 9,164,619 B2 * | 10/2015 | Goodlein | ............... | G06F 3/0488 |
| 2003/0074119 A1 * | 4/2003 | Arlinsky | ............... | B60K 35/00 701/36 |
| 2004/0030807 A1 * | 2/2004 | Wessler | ............... | G06F 1/1626 710/1 |
| 2006/0022958 A1 * | 2/2006 | Shiga | ............... | G06F 3/016 345/173 |
| 2006/0146037 A1 * | 7/2006 | Prados | ............... | G06F 3/016 345/173 |
| 2006/0146074 A1 * | 7/2006 | Harrison | ............... | B60K 35/00 345/660 |
| 2008/0001931 A1 * | 1/2008 | Szczerba | ............... | B60K 37/06 345/184 |
| 2009/0164062 A1 * | 6/2009 | Aoki | ............... | B60Q 1/0082 701/36 |
| 2009/0189373 A1 * | 7/2009 | Schramm | ............... | B60K 35/00 280/731 |
| 2010/0268426 A1 * | 10/2010 | Pathak | ............... | G06F 3/03547 701/48 |
| 2011/0040455 A1 * | 2/2011 | Lathrop | ............... | B60K 35/00 701/48 |
| 2011/0043468 A1 * | 2/2011 | Lathrop | ............... | B60K 37/06 345/173 |
| 2011/0082615 A1 * | 4/2011 | Small | ............... | B60K 35/00 701/36 |
| 2011/0082627 A1 * | 4/2011 | Small | ............... | B60K 35/00 701/48 |
| 2011/0169750 A1 * | 7/2011 | Pivonka | ............... | B60K 35/00 345/173 |
| 2012/0293450 A1 * | 11/2012 | Dietz | ............... | G06F 3/0414 345/174 |
| 2013/0050114 A1 * | 2/2013 | Backman | ............... | B60K 37/06 345/173 |
| 2013/0106693 A1 * | 5/2013 | Okuyama | ............... | G06F 3/0482 345/157 |
| 2013/0166146 A1 * | 6/2013 | Tanaka | ............... | G06F 3/0488 701/36 |
| 2013/0249824 A1 * | 9/2013 | Schaaf | ............... | B60K 35/00 345/173 |
| 2014/0078022 A1 * | 3/2014 | Dusterhoff | ............... | G06F 3/1423 345/3.1 |
| 2014/0090505 A1 * | 4/2014 | Okuyama | ............... | G06F 3/0219 74/485 |
| 2014/0143718 A1 * | 5/2014 | Kumakawa | ............... | G06F 3/0481 715/800 |
| 2014/0152600 A1 * | 6/2014 | Lee | ............... | G06F 3/0482 345/173 |
| 2014/0267066 A1 * | 9/2014 | Kolehmainen | ............... | G08C 17/02 345/173 |
| 2014/0303841 A1 * | 10/2014 | Frojdh | ............... | H04N 21/42201 701/36 |
| 2014/0371987 A1 * | 12/2014 | Van Wiemeersch | ............... | B62D 1/04 701/41 |
| 2015/0054760 A1 * | 2/2015 | Amaru | ............... | G02B 27/0101 345/173 |
| 2015/0066294 A1 * | 3/2015 | Sivertsen | ............... | B60K 35/00 701/36 |
| 2015/0317750 A1 * | 11/2015 | Benhuri | ............... | G06Q 50/01 705/319 |

* cited by examiner

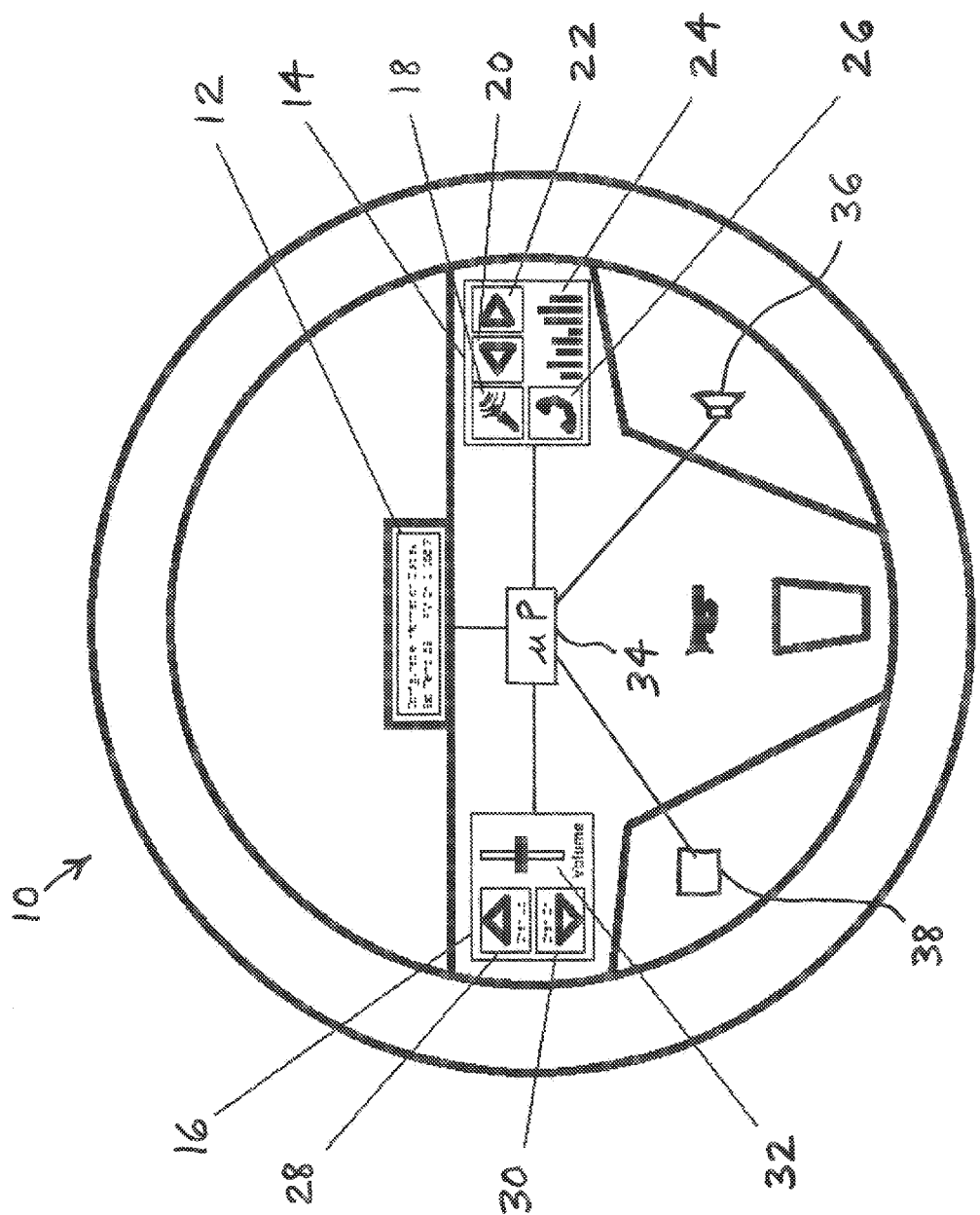

CONFIGURABLE TOUCH SCREEN LCD STEERING WHEEL CONTROLS

CROSS-REFERENCE TO RELATED APPLICATIONS

This application is a continuation of U.S. patent application Ser. No. 14/638,759, filed on Mar. 4, 2015, which is currently under allowance, which claims the benefit of U.S. Provisional Application No. 61/947,620, filed on Mar. 4, 2014, which the disclosures of which are hereby incorporated by reference in their entirety for all purposes.

BACKGROUND OF THE INVENTION

1. Field of the Invention

The present invention relates to electronic controls and displays within a motor vehicle, and, more particularly, to electronic controls and displays on a steering wheel of a motor vehicle.

2. Description of the Related Art

Steering wheels typically have fixed buttons with permanent functions and permanent types which the driver may or may not find useful. That is, current steering wheels provide fixed-function controls which are usually in the form of pushbuttons or scroll wheels which are not configurable by the user.

SUMMARY OF THE INVENTION

The invention may provide a steering wheel including one or more back-lit liquid crystal diode (LCD) displays with touch screens. The displays can display control widgets such as buttons, sliders, etc. as well as display widgets with graphical or textual information such as the selected radio station, volume level, etc. Due to the nature of the LCD/touch screen device, the controls or information widgets can be user-configurable. The user can decide which types of control/information widgets are most useful and may configure the LCD/touch screen device(s) to include the most useful control/information widgets.

The present invention may provide user-configurable controls to ensure that the driver has instant access to the controls/information he desires. The invention may enable the driver to configure the controls and display such that the driver has the controls/information of his choosing conveniently located on the steering wheel. Thus, the driver does not need to take his hand off the steering wheel to adjust radio and/or environmental controls.

The invention may include one or more LCD/touch screen devices located on the steering wheel within close proximity to the driver's hands. There may also be an information display that is centrally located to provide response/status/configuration messages or graphical data. The information display may not include a touch screen or be touch-sensitive.

In one embodiment, the invention comprises an entertainment system control arrangement for a motor vehicle including a graphical liquid crystal display with a configurable touch screen. The graphical liquid crystal display is disposed on the steering wheel. A processor is communicatively coupled to the graphical liquid crystal display. The processor prompts a user to select a function to assign to the configurable touch screen. The processor assigns the selected function to the configurable touch screen.

In another embodiment, the invention comprises a method of providing an entertainment system control arrangement for a motor vehicle, including providing a steering wheel. A graphical display device with a configurable touch screen is provided. The graphical display device and touch screen are disposed on the steering wheel. A processor is communicatively coupled to the graphical display device. A user is prompted a user to indicate acceptance or rejection of a proposed assignment of a function to a first portion of the configurable touch screen. The user's indication is sensed. The indication includes the user touching either a second portion of the configurable touch screen to accept the proposed assignment or a third portion of the configurable touch screen to reject the proposed assignment. The function is assigned to the first portion of the configurable touch screen only if the user touching the second portion of the configurable touch screen has been sensed.

In yet another embodiment, the invention comprises a method of providing an entertainment system control arrangement for a motor vehicle, including providing a steering wheel. A graphical display device is provided with a configurable touch screen. The graphical display device and touch screen are disposed on the steering wheel. A processor is communicatively coupled to the graphical display device. A user is prompted to indicate acceptance or rejection of a proposed assignment of a first arrow to a first portion of the configurable touch screen and a second arrow to a second portion of the configurable touch screen. The user's indication is sensed. The indication includes the user touching either a third portion of the configurable touch screen to accept the proposed assignment or a fourth portion of the configurable touch screen to reject the proposed assignment. The first arrow is assigned to the first portion of the configurable touch screen and the second arrow is assigned to the second portion of the configurable touch screen only if the user touching the third portion of the configurable touch screen has been sensed. Presented on the graphical display device is a menu of a plurality of configuration choices for the configurable touch screen. The user is enabled to navigate through the menu by selectively touching at least one of the first portion of the configurable touch screen and the second portion of the configurable touch screen.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 1 is a plan view of one embodiment of a steering wheel entertainment system control arrangement of the present invention with configurable touch screen LCD controls.

DETAILED DESCRIPTION

Glossary

Configurable—capable of being assigned and re-assigned functions and/or icons to be displayed thereon, and/or capable of having its size changed Menu—a list of choices, which may be hierarchal or include categories and subcategories Processor—A computing device, such as a central processing unit or microprocessor, that controls electronic devices, performs calculations, executes commands, or manipulates data.

The embodiments hereinafter disclosed are not intended to be exhaustive or limit the invention to the precise forms disclosed in the following description. Rather the embodiments are chosen and described so that others skilled in the art may utilize its teachings.

At least one embodiment of the present invention will be shown and described, and this application may describe and/or show other embodiments of the present invention. It is understood that any reference to "the invention" is a reference to an embodiment of a family of inventions, with no single embodiment including an apparatus or process that is necessarily included in all embodiments, unless otherwise stated. Further, although advantages provided by some embodiments of the present invention may be described, it is to be understood that other embodiments may not include those same advantages, or may include different advantages. Any advantages described herein are not to be construed as limiting to any of the claims.

FIG. 1 is a plan view of one embodiment of a steering wheel entertainment system control arrangement 10 of the present invention with configurable touch screen LCD controls. Steering wheel entertainment system control arrangement 10 includes a graphical LCD display 12 which may not include a touch screen and may not be touch-sensitive, and graphical LCDs 14, 16 with touch-sensitive touch screens. A microprocessor 34 may be communicatively coupled to each of display 12 and graphical LCDs 14, 16.

Graphical LCDs 14 and 16 each include a respective plurality of sections or portions which each have a respective function and function-identifying icon displayed thereon. In the embodiment shown, the portions or sections are square or rectangular. However, it is within the scope of the invention for these sections/portions to have different, possibly irregular, shapes.

Assigned to one of the sections/portions is a configurable control widget 18, which may be a pushbutton that controls voice commands, for example. That is, a user may press pushbutton 18 to cause the system to accept voice commands. Graphical LCD 14 may also include configurable control widgets in the form of left and right pushbutton controls 20, 22 for a menu. That is, the user may use pushbuttons 20, 22 to move an on-screen cursor in left and right directions within an on-screen menu. Graphical LCD 14 may further include a configurable graphical information widget 24, which may indicate sound levels, for example. Lastly, graphical LCD 14 may include a configurable control widget pushbutton 26, which may be depressed to initiate or answer a phone call, for example.

Graphical LCD 16 includes configurable control widgets in the form of channel up and channel down pushbutton controls 28, 30. That is, the user may use pushbuttons 28, 30 to change channels or stations in one sequential direction or the opposite sequential direction. Graphical LCD 16 may further include a configurable control widget slider 32, which may be used to control or change the audio volume level, for example.

During initialization of arrangement 10, microprocessor 34 may present the user with a menu of configuration choices on LCD display 12. For example, display 12 may query the user regarding which functions he would like to assign to each of widgets 18, 20, 22, 24, 26, 28, 30 and 32. In one embodiment, the configuration process may begin with the user being asked whether he would like to assign left and right arrows to controls 20, 22 and/or assign up and down arrows to controls 28, 30. At least one of the widgets may initially be designated a "yes" pushbutton, and another widget may initially he designated a "no" pushbutton. The user may use these "yes" and "no" pushbuttons to accept or reject the configuration choices presented on display 12, which may be default configurations. If the user does accept two or all four of these arrow assignments, then the user may subsequently use the arrows to navigate through a menu of other configuration choices presented on display 12 for the remaining widgets 18, 24, 26 and 32.

In another embodiment, the user is audibly queried via an in-vehicle loudspeaker 36 as to which functions he would like to assign to each of widgets 18, 20, 22, 24, 26, 28, 30 and 32. Additionally, or alternatively, the user may provide his configuration choices orally, and these oral responses may be detected by an in-vehicle microphone 38. The loudspeaker 36 and microphone 38 are communicatively coupled to processor 34.

Specific example embodiments of the invention are described in the following three paragraphs.

An entertainment system control arrangement for a motor vehicle includes a graphical liquid crystal display with a configurable touch screen. The graphical liquid crystal display is disposed on the steering wheel. A processor is communicatively coupled to the graphical liquid crystal display. The processor prompts a user to select a function to assign to the configurable touch screen. The processor assigns the selected function to the configurable touch screen.

A method of providing an entertainment system control arrangement for a motor vehicle includes providing a steering wheel. A graphical display device with a configurable touch screen is provided. The graphical display device and touch screen are disposed on the steering wheel. A processor is communicatively coupled to the graphical display device. A user is prompted a user to indicate acceptance or rejection of a proposed assignment of a function to a first portion of the configurable touch screen. The user's indication is sensed. The indication includes the user touching either a second portion of the configurable touch screen to accept the proposed assignment or a third portion of the configurable touch screen to reject the proposed assignment. The function is assigned to the first portion of the configurable touch screen only if the user touching the second portion of the configurable touch screen has been sensed.

A method of providing an entertainment system control arrangement for a motor vehicle includes providing a steering wheel. A graphical display device is provided with a configurable touch screen. The graphical display device and touch screen are disposed on the steering wheel. A processor is communicatively coupled to the graphical display device. A user is prompted to indicate acceptance or rejection of a proposed assignment of a first arrow to a first portion of the configurable touch screen and a second arrow to a second portion of the configurable touch screen. The user's indication is sensed. The indication includes the user touching either a third portion of the configurable touch screen to accept the proposed assignment or a fourth portion of the configurable touch screen to eject the proposed assignment. The first arrow is assigned to the first portion of the configurable touch screen and the second arrow is assigned to the second portion of the configurable touch screen only if the user touching the third portion of the configurable touch screen has been sensed. Presented on the graphical display device is a menu of a plurality of configuration choices for the configurable touch screen. The user is enabled to navigate through the menu by selectively touching at least one of the first portion of the configurable touch screen and the second portion of the configurable touch screen.

Each of the three embodiments described above in the preceding three paragraphs may be combined with any one, or any combination of, the following features:

Wherein the processor is configured to receive a selection of a function from the user.

Wherein the configurable touch screen includes a plurality of sections, the processor being configured to assign the selected function to one of the sections.

Wherein the processor is configured to prompt a user to select a respective function to assign to each of the sections of the configurable touch screen, and assign the selected functions to respective sections of the configurable touch screen.

Wherein a first one of the sections of the configurable touch screen is automatically assigned a yes/accept function and a second one of the sections of the configurable touch screen is automatically assigned a no/reject function.

Wherein the processor is configured to propose to the user a function for a third one of the sections, and receive an acceptance or rejection of the proposed function via the user touching the first one of the sections or the second one of the sections.

Wherein the processor is configured to present a menu of a plurality of configuration choices for the first one and the second one of the sections of the configurable touch screen, including a plurality of functions which the user may choose to be assigned to the first one and the second one of the sections of the configurable touch screen, the assignment of the functions to the first one and the second one of the sections occurring after the user has used the first one and the second one of the sections to indicate acceptance or rejection of the proposed function for the third one of the sections.

Wherein a first one of the sections of the configurable touch screen is automatically assigned a first arrow function and a second one of the sections of the configurable touch screen is automatically assigned a second arrow function, the first arrow pointing in a first direction opposite to a second direction in which the second arrow points.

Wherein the processor is configured to present a menu of functions to assign to a third one of the sections, enable the user to navigate the menu via the user touching the first one of the sections of the configurable touch screen and the second one of the sections of the configurable touch screen, receive a selection of one of the functions in the menu, and assign the selected function to the third one of the sections of the configurable touch screen.

Wherein at least two of the sections are of different sizes.

Wherein the graphical display device comprises a graphical liquid crystal display.

Wherein the function comprises a first function, and further comprising, if the user touching the third portion of the configurable touch screen has been sensed, prompting a user to indicate acceptance or rejection of a proposed assignment of a second function to the first portion of the configurable touch screen.

Further comprising sensing the user's indication of acceptance or rejection of the proposed assignment of the second function, the indication comprising the user touching either the second portion of the configurable touch screen to accept the proposed assignment or the third portion of the configurable touch screen to reject the proposed assignment, and assigning the second function to the first portion of the configurable touch screen only if the user touching the second portion of the configurable touch screen has been sensed.

Further comprising automatically assigning a yes/accept function to the second portion of the configurable touch screen and a no/reject function to the third portion of the configurable touch screen.

Further comprising automatically assigning a fourth portion of the configurable touch screen a first arrow function, automatically assigning a fifth portion of the configurable touch screen a second arrow function, the first arrow pointing in a first direction opposite to a second direction in which the second arrow points, presenting a menu of functions to assign to a sixth portion of the configurable touch screen, enabling the user to navigate the menu via the user touching the fourth portion of the configurable touch screen and the fifth portion of the configurable touch screen, receiving a selection of one of the functions in the menu, and assigning the selected function to the sixth portion of the configurable touch screen.

Wherein the first portion and the sixth portion of the configurable touch screen are of different sizes.

Wherein the first arrow points in a first direction, and the second arrow points in a second direction opposite to the first direction.

Wherein the proposed assignment comprises a first proposed assignment, and further comprising prompting a user to indicate acceptance or rejection of a second proposed assignment of a third arrow to a fifth portion of the configurable touch screen and a fourth arrow to a sixth portion of the configurable touch screen, the third arrow pointing in a third direction at an angle of ninety degrees relative to each of the first direction and the second direction, the fourth arrow pointing in a fourth direction opposite to the third direction, sensing the user's indication, the indication comprising the user touching either the third portion of the configurable touch screen to accept the second proposed assignment or a fourth portion of the configurable touch screen to reject the second proposed assignment, assigning the third arrow to the fifth portion of the configurable touch screen and the fourth arrow to the sixth portion of the configurable touch screen only if the user touching the third portion of the configurable touch screen. has been sensed, and enabling the user to navigate through the menu by selectively touching the fifth portion of the configurable touch screen and/or the sixth portion of the configurable touch screen.

Wherein the menu of a plurality of configuration choices for the configurable touch screen includes a plurality of functions which the user may choose to be assigned to the third and fourth portions of the configurable touch screen, the assignment of the functions to the third and fourth portions occurring after the user has used the third and fourth portions to indicate acceptance or rejection of the second proposed assignment.

Further comprising receiving an indication from the user that he would like to reconfigure at least one of the portions of the configurable touch screen after each of the portions of the configurable touch screen have been configured, the indication comprising the user touching at least one of the portions of the configurable touch screen, in response to the receiving, presenting on the graphical display device a menu of a plurality of reconfiguration choices for the configurable touch screen, and enabling the user to navigate through the reconfiguration menu by selectively touching the first portion of the configurable touch screen and/or the second portion of the configurable touch screen.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An entertainment system control arrangement for a motor vehicle, comprising:
    a steering wheel;
    a graphical liquid crystal display with a configurable touch screen that includes a plurality of sections, the graphical liquid crystal display and touch screen being disposed on the steering wheel; and
    a processor communicatively coupled to the graphical liquid crystal display and configured to:
        automatically assign a first one of the sections of the configurable touch screen a yes/accept function;
        automatically assign a second one of the sections of the configurable touch screen a no/reject function;
        prompt a user to select a respective function to assign to each remaining said section of the configurable touch screen;
        receive a plurality of function selections from the user; and
        assign the selected functions to respective said remaining sections of the configurable touch screen;
    wherein the first one of the sections of the configurable touch screen is automatically assigned a first arrow function and the second one of the sections of the configurable touch screen is automatically assigned a second arrow function, the first arrow pointing in a first direction opposite to a second direction in which the second arrow points; and
    wherein the processor is configured to:
        present a menu of functions to assign to a remaining one of the sections; and
        enable the user to navigate the menu via the user touching the first one of the sections of the configurable touch screen and the second one of the sections of the configurable touch screen.

2. The system of claim 1 wherein the processor is configured to propose to the user a function for one of the remaining sections.

3. The system of claim 2 wherein the processor is configured to receive an acceptance or rejection of the proposed function via the user touching the first one of the sections or the second one of the sections.

4. The method of claim 2, wherein the processor is configured to present a menu of a plurality of configuration choices for the remaining sections of the configurable touch screen, including a plurality of functions which the user may choose to be assigned to the remaining sections of the configurable touch screen, the assignment of the functions to the remaining sections occurring after the user has used the first one and the second one of the sections to indicate acceptance or rejection of the proposed function for the one of the remaining sections.

5. The system of claim 1 wherein the processor is configured to:
    receive a selection of one of the functions in the menu; and
    assign the selected function to the remaining one of the sections of the configurable touch screen.

6. The system of claim 1 wherein at least two of the sections are of different sizes.

7. A method of providing an entertainment system control arrangement for a motor vehicle, comprising:
    providing a steering wheel;
    providing a graphical display device with a configurable touch screen, the graphical display device and touch screen being disposed on the steering wheel;
    communicatively coupling a processor to the graphical display device;
    prompting a user to indicate acceptance or rejection of a proposed assignment of a first function to a first portion of the configurable touch screen;
    sensing the user's indication, the indication comprising the user touching either a second portion of the configurable touch screen to accept the proposed assignment or a third portion of the configurable touch screen to reject the proposed assignment;
    assigning the first function to the first portion of the configurable touch screen in response to sensing the user touching the second portion of the configurable touch screen; and
    in response to sensing the user touching the third portion of the configurable touch screen, prompting a user to indicate acceptance or rejection of a proposed assignment of a second function to the first portion of the configurable touch screen.

8. The method of claim 7, further comprising sensing the user's indication of acceptance or rejection of the proposed assignment of the second function, the indication comprising the user touching either the second portion of the configurable touch screen to accept the proposed assignment or the third portion of the configurable touch screen to reject the proposed assignment.

9. The method of claim 8, further comprising assigning the second function to the first portion of the configurable touch screen only if the user touching the second portion of the configurable touch screen has been sensed.

10. The method of claim 7 further comprising automatically assigning a yes/accept function to the second portion of the configurable touch screen and a no/reject function to the third portion of the configurable touch screen.

11. The method of claim 7 further comprising:
    automatically assigning a fourth portion of the configurable touch screen a first arrow function;
    automatically assigning a fifth portion of the configurable touch screen a second arrow function, the first arrow pointing in a first direction opposite to a second direction in which the second arrow points;
    presenting a menu of functions to assign to a sixth portion of the configurable touch screen;
    enabling the user to navigate the menu via the user touching the fourth portion of the configurable touch screen and the fifth portion of the configurable touch screen;
    receiving a selection of one of the functions in the menu; and
    assigning the selected function to the sixth portion of the configurable touch screen.

12. The method of claim 11 wherein the first portion and the sixth portion of the configurable touch screen are of different sizes.

13. A method of providing an entertainment system control arrangement for a motor vehicle, comprising:
    providing a steering wheel;
    providing a graphical display device with a configurable touch screen, the graphical display device and touch screen being disposed on the steering wheel;

communicatively coupling a processor to the graphical display device;

prompting a user to indicate acceptance or rejection of a proposed assignment of a first arrow to a first portion of the configurable touch screen and a second arrow to a second portion of the configurable touch screen;

sensing the user's indication, the indication comprising the user touching either a third portion of the configurable touch screen to accept the proposed assignment or a fourth portion of the configurable touch screen to reject the proposed assignment;

assigning the first arrow to the first portion of the configurable touch screen and the second arrow to the second portion of the configurable touch screen only when the user touching the third portion of the configurable touch screen has been sensed;

presenting on the graphical display device a menu of a plurality of configuration choices for the configurable touch screen; and enabling the user to navigate through the menu by selectively touching at least one of the first portion of the configurable touch screen and the second portion of the configurable touch screen.

14. The method of claim 13, wherein the graphical display device comprises a graphical liquid crystal display, the first arrow points in a first direction, and the second arrow points in a second direction opposite to the first direction.

15. The method of claim 14, wherein the proposed assignment comprises a first proposed assignment, the method further comprising:

prompting a user to indicate acceptance or rejection of a second proposed assignment of a third arrow to a fifth portion of the configurable touch screen and a fourth arrow to a sixth portion of the configurable touch screen, the third arrow pointing in a third direction at an angle of ninety degrees relative to each of the first direction and the second direction, the fourth arrow pointing in a fourth direction opposite to the third direction;

sensing the user's indication, the indication comprising the user touching either the third portion of the configurable touch screen to accept the second proposed assignment or a fourth portion of the configurable touch screen to reject the second proposed assignment;

assigning the third arrow to the fifth portion of the configurable touch screen and the fourth arrow to the sixth portion of the configurable touch screen only if the user touching the third portion of the configurable touch screen has been sensed; and enabling the user to navigate through the menu by selectively touching at least one of the fifth portion of the configurable touch screen and the sixth portion of the configurable touch screen.

16. The method of claim 15, wherein the menu of a plurality of configuration choices for the configurable touch screen includes a plurality of functions which the user may choose to be assigned to the third and fourth portions of the configurable touch screen, the assignment of the functions to the third and fourth portions occurring after the user has used the third and fourth portions to indicate acceptance or rejection of the second proposed assignment.

17. The method of claim 13, further comprising:

receiving an indication from the user that he would like to reconfigure at least one of the portions of the configurable touch screen after each of the portions of the configurable touch screen have been configured, the indication comprising the user touching at least one of the portions of the configurable touch screen;

in response to the receiving, presenting on the graphical display device a menu of a plurality of reconfiguration choices for the configurable touch screen; and enabling the user to navigate through the reconfiguration menu by selectively touching at least one of the first portion of the configurable touch screen and the second portion of the configurable touch screen.

18. The method of claim 13, further comprising presenting a menu of a plurality of configuration choices for the third portion and the fourth portion of the configurable touch screen, including a plurality of functions which the user selects to be assigned to the third portion and the fourth portion of the configurable touch screen.

* * * * *